No. 691,483. Patented Jan. 21, 1902.
C. E. PATRIC.
DISTRIBUTER FOR GRAIN DRILLS.
(Application filed May 6, 1901.)
(No Model.) 3 Sheets—Sheet 1.
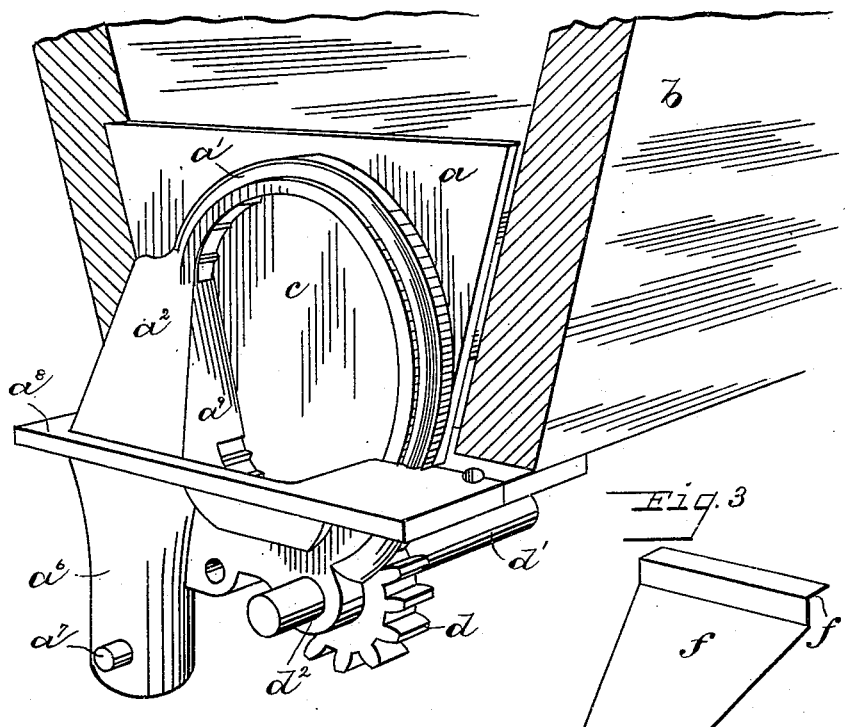
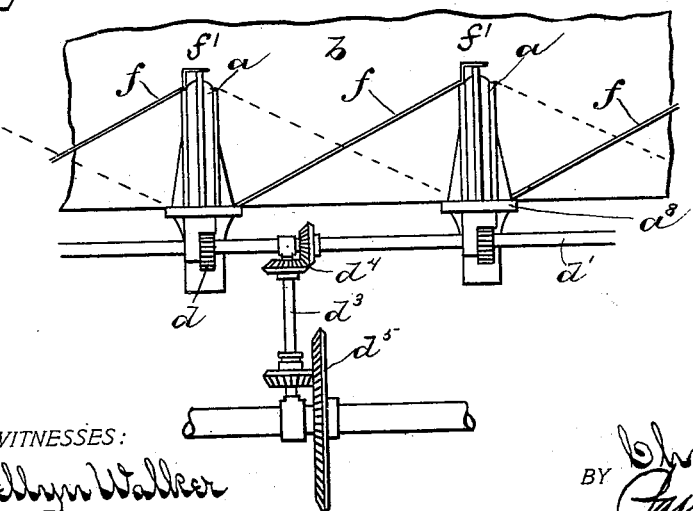

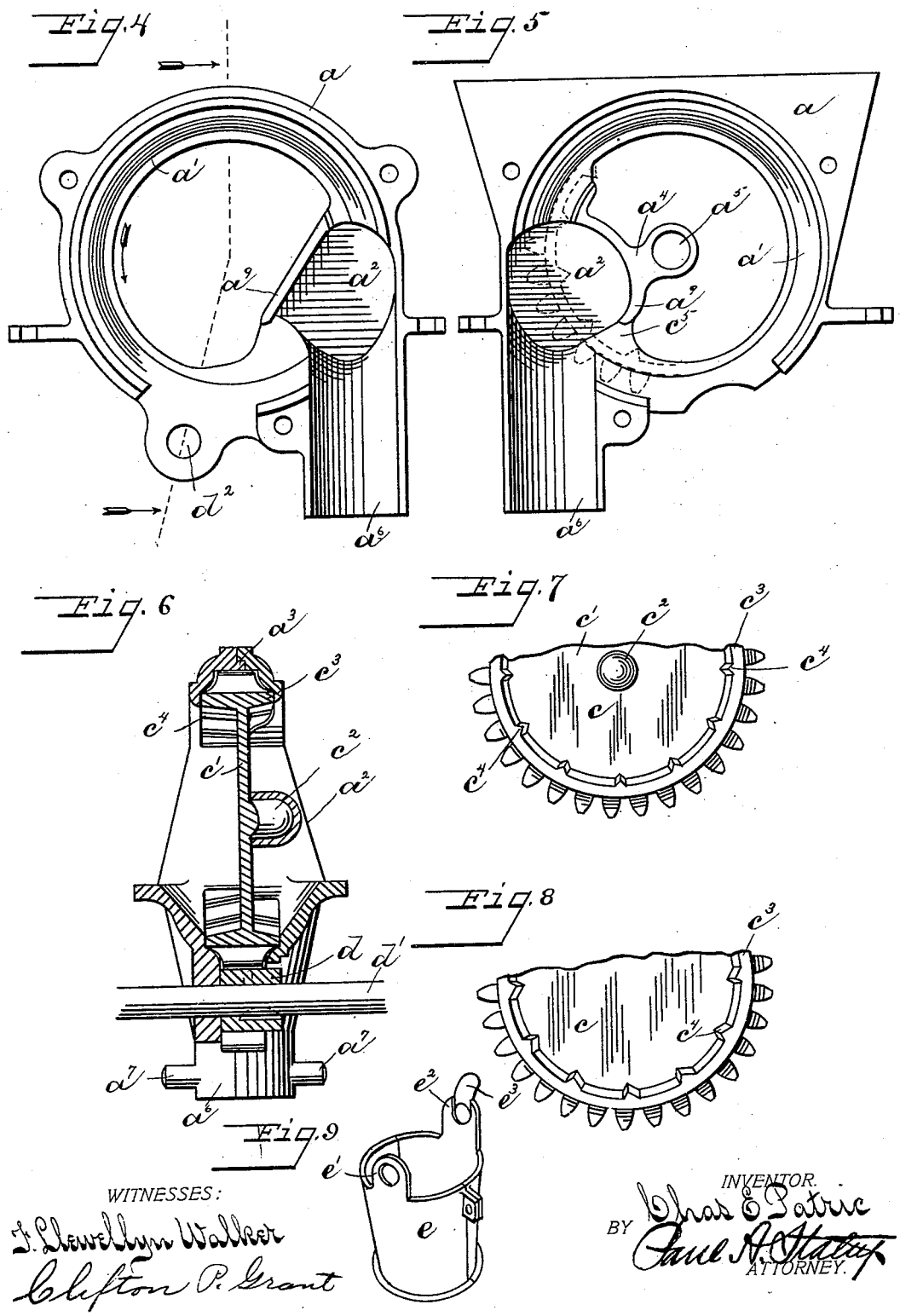

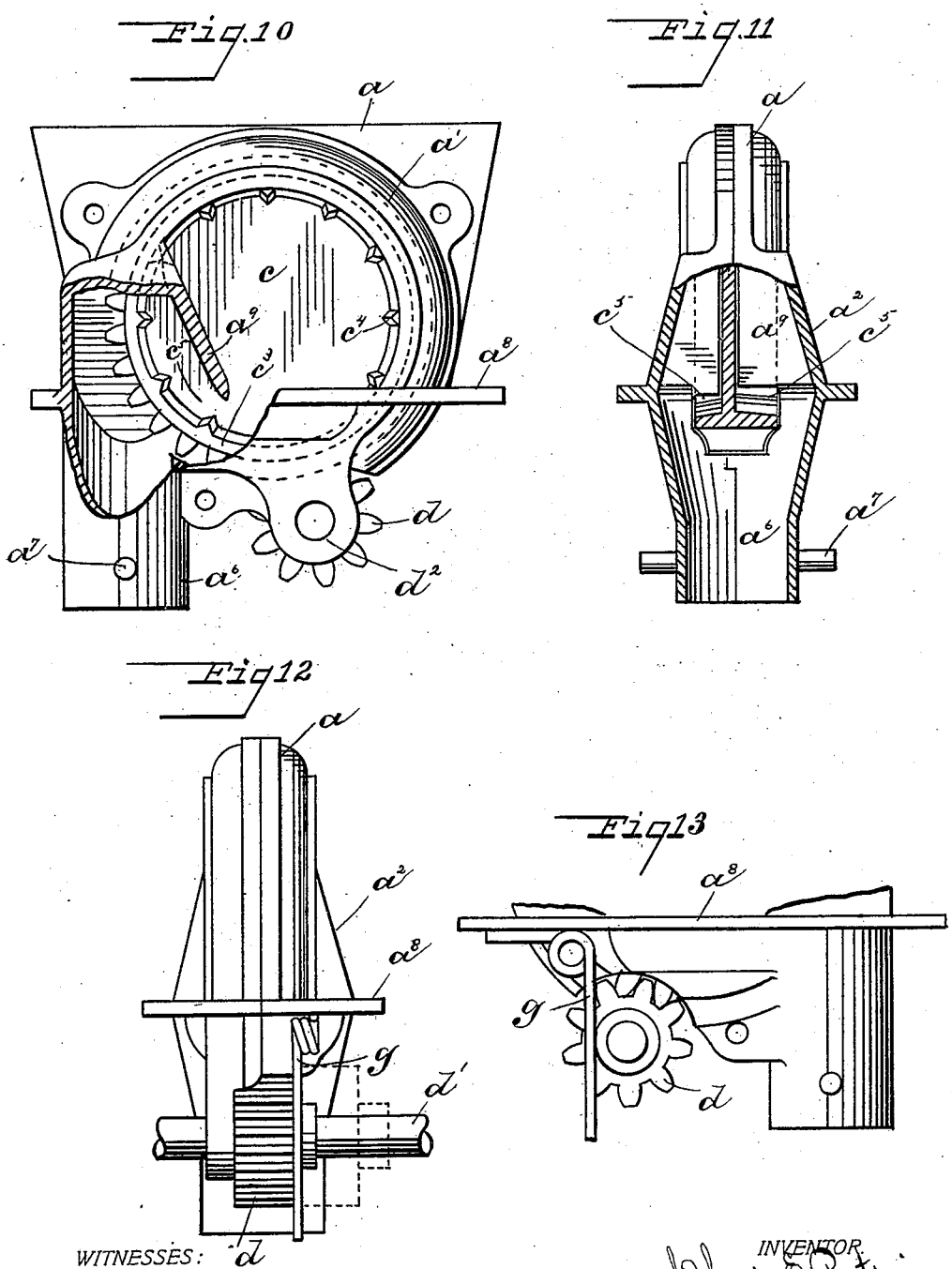

UNITED STATES PATENT OFFICE.

CHARLES E. PATRIC, OF SPRINGFIELD, OHIO, ASSIGNOR TO THE SUPERIOR DRILL COMPANY, OF SPRINGFIELD, OHIO, A CORPORATION OF OHIO.

DISTRIBUTER FOR GRAIN-DRILLS.

SPECIFICATION forming part of Letters Patent No. 691,483, dated January 21, 1902.

Application filed May 6, 1901. Serial No. 58,891. (No model.)

*To all whom it may concern:*

Be it known that I, CHARLES E. PATRIC, a citizen of the United States, residing at Springfield, in the county of Clark and State of Ohio, have invented certain new and useful Improvements in Distributers for Grain-Drills, of which the following is a specification.

My invention relates to improvements in devices for sowing or distributing seed from the hoppers to the grain-conduits or furrow-openers of seeding-machines.

The seed cups or distributers which have heretofore been employed in that class of seeding machinery known as "drills" may be divided into two general classes—to wit, those which have variable throats or openings through which the seed passes or is carried in order to distribute or sow the required quantity, and, second, those in which an orifice of fixed size is employed in connection with a movable carrying device to which a variable speed may be applied to vary the quantity of grain distributed or sown.

Inasmuch as in modern seeding the quantity of seed to be distributed over a given territory (in some cases as low as a quart to the acre) must be measured accurately, it follows that the measuring devices of distributers must be so constructed as to distribute the seed uniformly and accurately, and it has been found, therefore, that those in which a fixed measuring-orifice is employed with a variable-speed device have been the most satisfactory. These devices are also required to sow seed of varying sizes and of various conditions, and it has been my purpose to invent a device which is adapted to sow the small seed as well as the larger sizes without clogging and to sow them uniformly and evenly. I overcome these difficulties in a large measure by the constructions herein described and set forth.

In the accompanying drawings, Figure 1 is a perspective view of a portion of the hopper embodying my device. Fig. 2 is a rear view. Fig. 3 is a detail of the guiding-plate. Figs. 4 and 5 illustrate the halves of the housing. Fig. 6 is a section of the device, taken on the line $x\ x$ of Fig. 4 looking in the direction of the arrows. Figs. 7 and 8 show opposite sides of the distributing-wheel. Fig. 9 is a perspective view of the hose connection. Fig. 10 is a side elevation of the device, partly broken away. Fig. 11 is a section through the measuring-channel. Fig. 12 is a rear view, and Fig. 13 is a side elevation, of a portion of my device.

Like parts are represented by similar letters of reference in the several views.

In constructing my device I employ the outer casing $a$, having the annular chamber $a'$ and the housing $a^2$ extending therefrom. Said casing is made in halves joined together with the interlocking male and female joint $a^3$ and is mounted in the hopper $b$, and on a recess $a^5$ of an inwardly-projecting arm $a^4$ carries a distributing-wheel $c$, said wheel having a central web $c'$ with a trunnion $c^2$ extending from one side thereof journaled in said recess. Said wheel is further formed with a flange $c^3$, having on its outer surface the ordinary cogs of a spur-gear and upon its inner periphery, on each side of the web $c'$, the ribs $c^4$ to carry the grain. The housing $a^2$ projects at $a^9$ over a portion of the flange $c^3$, and forms with said flange a measuring-channel $c^5$ on each side of said wheel. The distributing-wheel $c$ is driven by the pinion $d$, mounted upon the shaft $d'$, which is journaled in the casing at $d^2$ and extends under the hopper. This shaft $d'$ is driven from the axle of the machine through the shaft $d^3$ and the gears $d^4$ and $d^5$ and is given different speeds through the medium of the gears $d^5$, formed in a well-known manner.

The hose connection $e$, formed with the perforated ear $e'$ and the slotted ear $e^2$, having the spring-pressed latch $e^3$, is attached to the lugs $a^7$ of the conduit $a^6$ of the housing by slipping the ear $e'$ over one of said lugs and the ear $e^2$, with the spring-pressed latch $e^3$, over the other, said latch holding it in place.

The distributing-wheel, with its carrying flange, is driven in the annular chamber of the casing in the direction of the arrow shown in Fig. 4, and the grain, contacting with the side of said wheel and carrying-flange, is carried up by the ribs of said flange through the measuring-channel and discharged into the housing, when it drops through its conduit and hose connection.

It being desirable to arrange that both coarse and fine grain may be sown by the same machine, I provide for this by making the distributing-wheel on one side of its web deeper and the opening through the measuring-channel larger than upon the other side. The removable guiding plates or shields $f$, formed at one end with the shoulders $f'$ resting on the top of the casing $a$ and at the other end on the flange $a^8$ of the casing next adjacent, feeds the grain to either side of the distributing-wheel, as may be desired, the solid lines of Fig. 2 showing them placed for feeding the grain to one side and the dotted lines to the other side of the wheel.

The pinions $d$ are slidingly mounted upon the shaft $d'$ by a feather or key, and the spring $g$, attached to the flange $a^8$ of the casing, bears against the pinion to hold it in place, said spring being adapted to be moved out of position, so that said pinion may be moved out of engagement with the distributing-wheel. It will be seen that the arrangement is such that any one or more of the distributing devices may be thrown out of engagement and become inoperative.

It will be seen that by driving the distributing-wheel from its periphery I am enabled to place the driving-shaft outside of and the wheel and its casing within the hopper, so that each side of the web of the wheel, with its carrying-flange, is fully open to the grain in the hopper except where it passes through the housing, so that the grain is in contact with and agitated by the wheel and will not bridge over in the hopper. This construction also avoids the contracted openings of the casing below the hopper that necessarily follow where the distributing-wheel is below or only partially extends up into the hopper. Furthermore it will be noted that the measuring-channel being above the bottom of the hopper the grain is carried up through it, thus insuring accurate measurement of the grain. It will be further seen that as the seed is discharged into the closed housing and drops through its conduit and connection into the hose or seed-tube it is not exposed at any point to be blown away by the wind, but is safely delivered into the furrow.

While I have described but one casing and distributing-wheel, it will be understood that there are a series of them placed in the hopper, each wheel being driven from the axle by gears, as described. The casing being made in halves, the interengaging male and female joint, as described, gives a very strong and perfect construction.

Having thus described my invention, I claim—

1. In a seed-distributer, in combination with a seed-hopper, an outer casing, a distributing-wheel mounted in said casing having a carrying-flange, and a central web with a laterally-extending trunnion from one side of said web, a housing forming part of said casing and projecting over a portion of said flange to form a measuring-channel, and means for driving said wheel from its periphery whereby said wheel is entirely exposed to the grain at one side except where covered by said housing, substantially as specified.

2. In a seed-distributer, a carrying-wheel having a carrying-flange, a casing in which said wheel is mounted having an annular flange the inner periphery of which is adjacent to the carrying-flange on said wheel, a housing forming a part of said casing and projecting over a portion of the carrying-flange to form a measuring-channel, said casing being otherwise open at the side to leave the entire carrying-flange exposed except where it passes through said housing and to permit the grain to move laterally into the carrying-wheel, substantially as specified.

3. In a seed-distributer, in combination with a seed-hopper, a casing having an annular chamber, a wheel, the periphery of which fits into said chamber, having a central web and oppositely-extending carrying-flanges, a central support on one side of said wheel only, and a housing, a portion of which extends over a portion of the respective flanges to form measuring-channels, as described, and means for driving said wheel from its periphery whereby the entire carrying portion of said flanges may be exposed to the grain, substantially as specified.

4. The combination with a hopper, of a casing extending into the hopper having an annular chamber in which is mounted a distributer-wheel having a laterally-extending carrying-flange, a housing also in said hopper through which said flange is adapted to pass to form a measuring-channel and lateral discharge as described, means for driving said carrying-wheel from its periphery whereby the entire exposed portion of the carrying-flange is located within the hopper, substantially as specified.

5. In a distributer, in combination with a seed-hopper, a casing having an annular chamber, a distributer-wheel having a solid central web and oppositely-extending lateral flanges, the periphery of which is mounted in said annular chamber, a housing extending on each side of said casing and forming a discharge-chamber which communicates with said annular chamber, said housing being provided with an inwardly-extending portion which extends over the carrying-flange and forms a measuring-channel, said casing being otherwise open at the sides to leave the entire carrying-flanges exposed except where they pass through said housing, substantially as specified.

6. The combination with the casing and distributer mounted therein, said casing being located in the bottom of a hopper, a distributer-wheel in said casing, the periphery of which is protected by said casing, and a housing forming a discharge-chamber also extended into said hopper, and a closed conduit connected with said housing, and means for driving said distributer from the periphery, substantially as specified.

7. In a seed-distributer and in combination with the seed-hopper, an outer casing, a distributer-wheel having a central web and a laterally-extending flange, said wheel being supported wholly from one side so as to leave the opposite side and its carrying-flange exposed and within said hopper, a housing formed in said casing and having one side extending over a portion of said carrying-flange, and means for driving said distributer from its periphery, substantially as specified.

8. The combination with a seed-hopper, of a distributer formed of a casing having an annular chamber and a distributer-wheel located in said casing with its periphery extending into said chamber, a measuring-channel formed by a portion of said casing and the carrying-flange of said distributer-wheel, means for driving said wheel from its periphery, and shields extending from the top of said casing at an angle toward the bottom of said hopper and thus forming inclined chutes to direct the seed from said hopper to one side only of said distributing-wheels, said shields being adapted to form the bottom of said hopper, substantially as specified.

9. The combination with the seed-hopper, of the distributers extending entirely into said hopper, reversible shields adapted to rest at one end on top of said casing and at the other on a projecting flange near the bottom thereof, said shields being adapted to form the bottom of said hopper and direct the grain into one side only of said distributers, substantially as specified.

10. The combination with a seed-hopper, of a distributer-wheel located at the bottom of said hopper having a solid central web and peripheral oppositely-extending carrying-flanges, said flanges being protected by an annular casing having a discharge-opening and an inwardly-projecting arm upon one side thereof to support said wheel, whereby said web and the carrying portions of said flanges are exposed to the grain except where they pass said arm and discharge, and means for driving said wheel, substantially as specified.

11. In a seed-distributer, an outer casing having an annular chamber, a carrying-wheel having a carrying-flange mounted in said annular chamber with the edge of said flange adjacent to and protected by the edge of said annular chamber, a housing forming part of said casing and projecting over a portion of the flange to form a measuring-channel, said casing being otherwise open at the side to leave the entire carrying-flange exposed except where it passes through said housing, and means for driving said wheel, substantially as specified.

12. The combination with a seed-hopper and a series of distributer-wheels with their casings, as described, and a shaft, of pinions slidingly mounted on said shaft to drive said wheels, and stops to hold each of said pinions independent of the others in and out of engagement, substantially as and for the purpose specified.

13. The combination with a seed-hopper and a series of distributer-wheels with their casings, as described, and a shaft, of pinions slidingly mounted on said shaft to drive said wheels, and stops pivoted to said casings to swing transversely to said shaft adjacent to said pinions to hold each of said pinions independent of the others in and out of engagement, substantially as and for the purpose specified.

14. The combination with a seed-hopper, and a series of distributing-wheels therein, provided with peripheral driving-teeth, of a driving-shaft, pinions mounted on said shaft to engage the teeth of said distributing-wheels, and means for throwing said pinions in and out of gear with the teeth of said distributing-wheels independently of each other, substantially as specified.

In testimony whereof I have hereunto set my hand this 3d day of May, A. D. 1901.

CHARLES E. PATRIC.

Witnesses:
CHAS. I. WELCH,
CLIFTON P. GRANT.